(12) United States Patent
Schwartz

(10) Patent No.: US 12,338,917 B2
(45) Date of Patent: Jun. 24, 2025

(54) COLOR CHANGING CRIMP RING DEVICE

(71) Applicant: Simon Schwartz, Bristow, IN (US)

(72) Inventor: Simon Schwartz, Bristow, IN (US)

( * ) Notice: Subject to any disclaimer, the term of this patent is extended or adjusted under 35 U.S.C. 154(b) by 47 days.

(21) Appl. No.: 18/379,522

(22) Filed: Oct. 12, 2023

(65) Prior Publication Data

US 2025/0122960 A1    Apr. 17, 2025

(51) Int. Cl.
*F16L 13/14* (2006.01)

(52) U.S. Cl.
CPC ......... *F16L 13/141* (2013.01); *F16L 2201/10* (2013.01)

(58) Field of Classification Search
CPC ............................. F16L 13/141; F16L 2201/10
USPC .............................................................. 285/93
See application file for complete search history.

(56) References Cited

U.S. PATENT DOCUMENTS

| 5,531,483 A * | 7/1996 | Christian ................ F16L 33/02 156/86 |
| 6,378,908 B1 | 4/2002 | Walker |
| 6,609,865 B2 * | 8/2003 | Daigneault ........... F16B 31/028 411/13 |
| 7,201,382 B2 | 4/2007 | Vigener |
| 7,478,843 B2 | 1/2009 | Dole |
| 7,649,469 B2 * | 1/2010 | Smith ..................... F16B 31/02 73/762 |
| 9,523,451 B1 * | 12/2016 | Nichols ................ F16L 13/141 |
| 12,055,255 B2 * | 8/2024 | Higginbotham ...... F16L 13/142 |
| 2006/0097518 A1 * | 5/2006 | Bott ....................... F16L 13/141 285/382 |
| 2010/0253066 A1 | 10/2010 | Cygler, III |
| 2015/0276099 A1 | 10/2015 | Weissmann |
| 2018/0135791 A1 * | 5/2018 | Twaroski ............... F16L 13/141 |

FOREIGN PATENT DOCUMENTS

AU    636419    2/1992

* cited by examiner

*Primary Examiner* — David Bochna

(57) ABSTRACT

A color changing crimp ring device to facilitate a worker to visually identify that a crimp ring on a plumbing line has been fully crimped includes a crimp ring that is comprised of deformable material to resist being deformed until exposed to a sufficient compressive force generated by a crimping tool for crimped the crimp ring around a cross-linked polyethylene plumbing pipe. A reactive layer is applied to the crimp ring and the reactive layer normally displays a neutral color. The reactive layer reacts to the sufficient compressive force generated by the crimping tool such that the reactive layer displays a highly visible color. In this way the reactive layer facilitates a worker to visually identify that the crimp ring has been fully crimped onto the cross-linked polyethylene plumbing pipe.

7 Claims, 4 Drawing Sheets

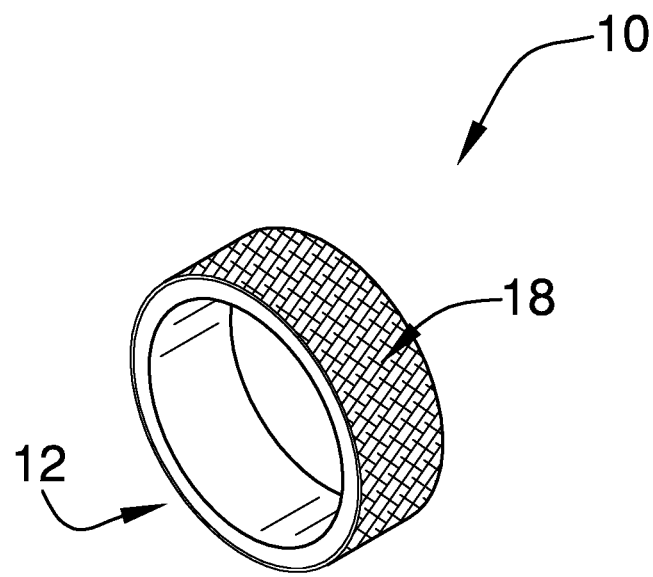
FIG. 1
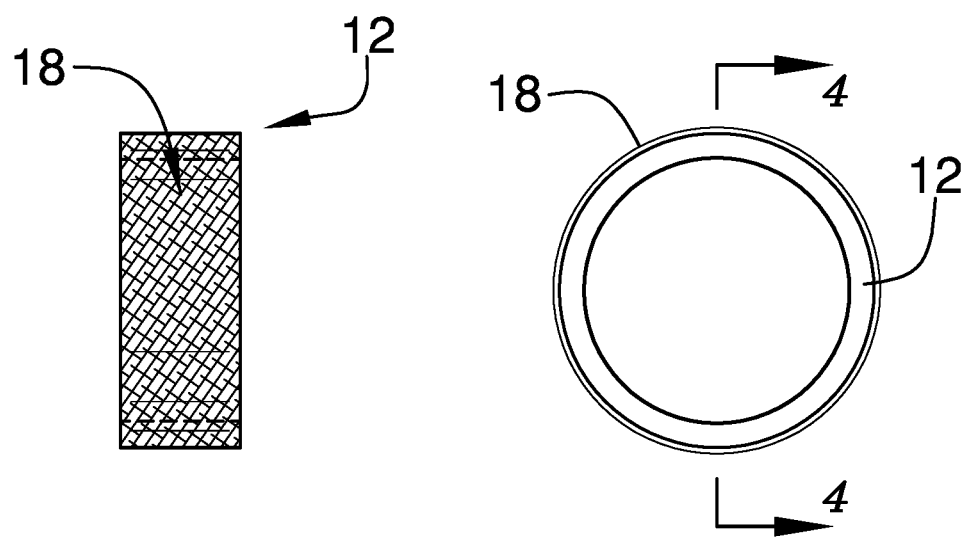
FIG. 2
FIG. 3

COLOR CHANGING CRIMP RING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to crimp ring devices and more particularly pertains to a new crimp ring device to facilitate a worker to visually identify that a crimp ring on a plumbing line has been fully crimped. The device includes a crimp ring and a reactive layer extending around the crimp ring. The reactive layer normally displays a neutral color and the reactive layer displays a highly visible color when the reactive layer is exposed to sufficient compressive force. In this way the reactive layer changes color when the crimp ring is crimped with a crimping tool to facilitate a worker to visually identify that the crimp ring has been fully crimped.

(2) Description of Related Art Including Information Disclosed Under 37 CFR 1.97 and 1.98

The prior art relates to crimp ring devices including a variety of crimped pipe connections for forming a fluid impermeable joint between a pair of pipes by employing a crimping tool. In no instance does the prior art disclose a crimping ring which has a reactive layer that normally displays a neutral color and which displays a highly visible color when exposed to sufficient compressive force to facilitate a worker to visually identify that the crimp ring has been fully crimped.

BRIEF SUMMARY OF THE INVENTION

An embodiment of the disclosure meets the needs presented above by generally comprising a crimp ring that is comprised of deformable material to resist being deformed until exposed to a sufficient compressive force generated by a crimping tool for crimped the crimp ring around a cross-linked polyethylene plumbing pipe. A reactive layer is applied to the crimp ring and the reactive layer normally displays a neutral color. The reactive layer reacts to the sufficient compressive force generated by the crimping tool such that the reactive layer displays a highly visible color. In this way the reactive layer facilitates a worker to visually identify that the crimp ring has been fully crimped onto the cross-linked polyethylene plumbing pipe.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 1 is a perspective view of a color changing crimp ring device according to an embodiment of the disclosure.

FIG. 2 is a front view of an embodiment of the disclosure.

FIG. 3 is a top view of an embodiment of the disclosure.

DETAILED DESCRIPTION OF THE INVENTION

Figure 4:
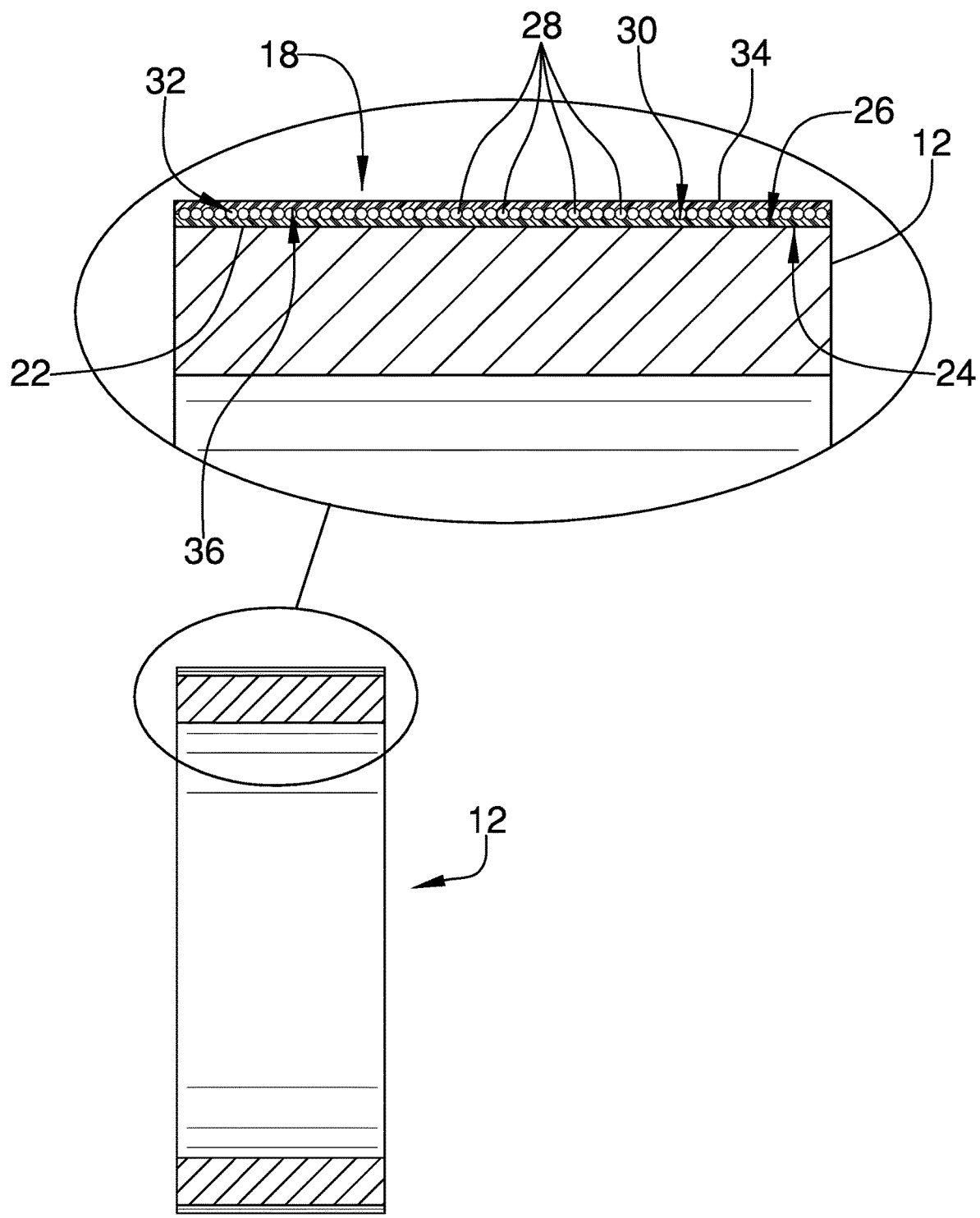
FIG. 4 is a cross sectional view taken along line 4-4 of FIG. 3 of an embodiment of the disclosure.
Figure 5:
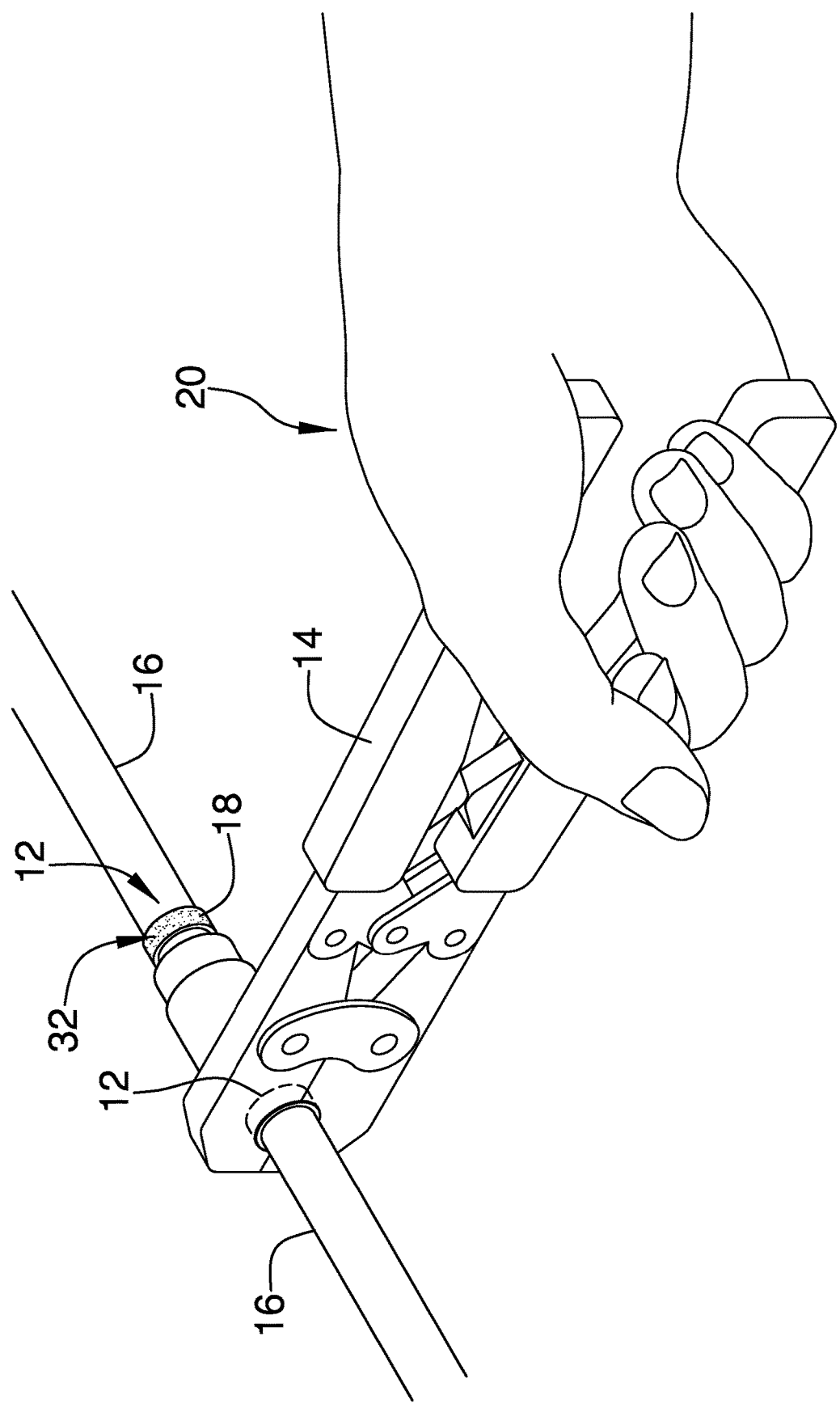
FIG. 5 is a perspective in-use view of an embodiment of the disclosure showing a crimping tool being employed to crimp a crimp ring.
Figure 6:
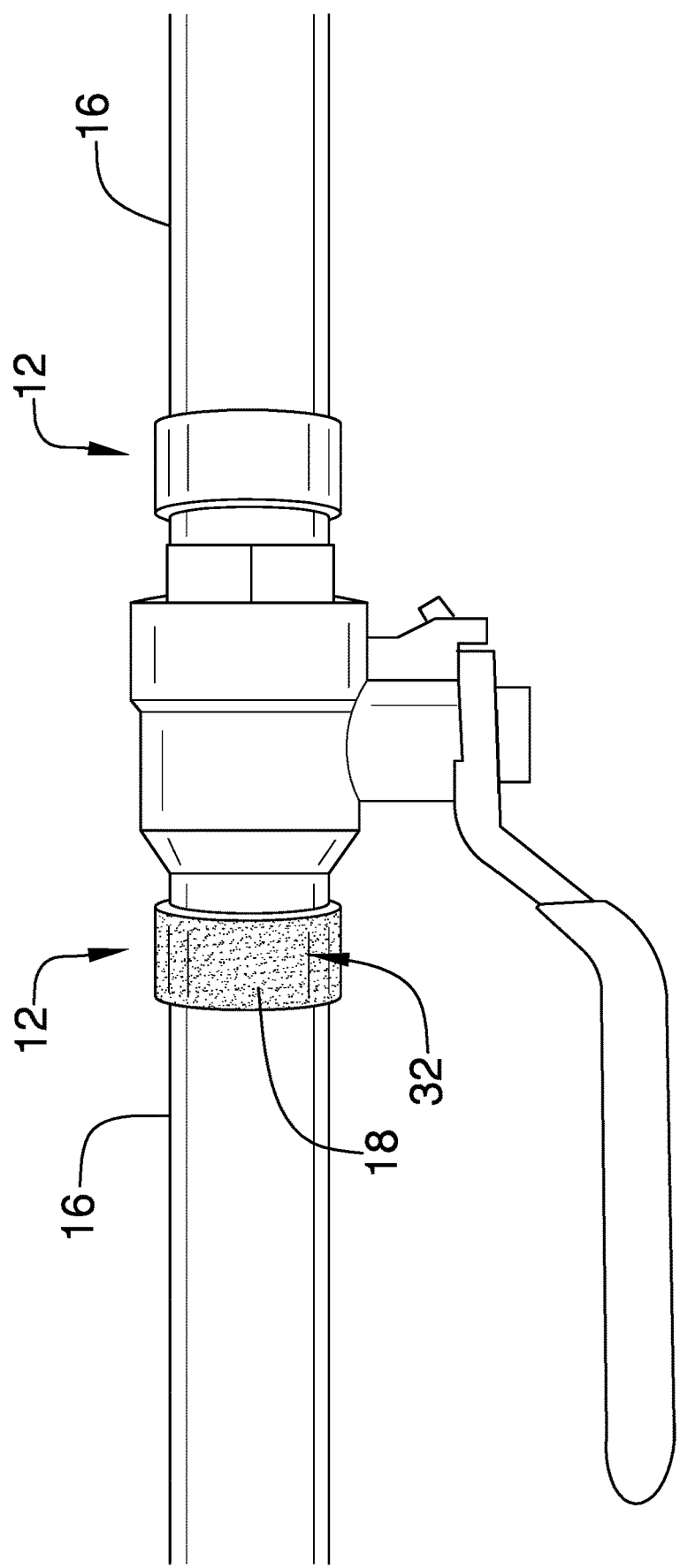
FIG. 6 is a perspective in-use view of an embodiment of the disclosure showing a fully crimped crimp ring and a non-crimped crimping ring.

With reference now to the drawings, and in particular to FIGS. 1 through 6 thereof, a new crimp ring device embodying the principles and concepts of an embodiment of the disclosure and generally designated by the reference numeral 10 will be described.

As best illustrated in FIGS. 1 through 6, the color changing crimp ring device 10 generally comprises a crimp ring 12 which is comprised of deformable material, including but not being limited to annealed copper, that is sufficiently resilient to facilitate the crimp ring 12 to resist being deformed until exposed to a sufficient compressive force generated by a crimping tool 14. In this way the crimp ring 12 can be crimped around a cross-linked polyethylene plumbing pipe 16. The crimping tool 14 may be a crimping tool of any conventional design that is commonly employed for the installation of cross-linked polyethylene plumbing pipes. Additionally, the crimp ring 12 may be a crimp ring of any conventional design that is commonly employed for cross-linked polyethylene.

A reactive layer 18 is applied to the crimp ring 12 and the reactive layer 18 normally displays a neutral color which may include but not be limited to grey or white. The reactive layer 18 reacts to the sufficient compressive force generated by the crimping tool 14 such that the reactive layer 18 displays a highly visible color. In this way the reactive layer 18 facilitates a worker 20 to visually identify that the crimp ring 12 has been fully crimped onto the cross-linked polyethylene plumbing pipe 16. The reactive layer 18 comprises a lower layer 22 which has a bottom surface 24 that is bonded to an outer surface 26 of the crimp ring 12. The lower layer 22 completely covers the outer surface 26 of the crimp ring 12 having the lower layer 22 extending around a full circumference of the outer surface 26. Furthermore, the lower layer 22 may comprise a synthetic textile, including but not being limited to polyester or nylon.

The reactive layer 18 includes a series of tubules 28 applied to a top surface 30 of the lower layer 22. Each of the series of tubules 28 is continuous such that each of the series of tubules 28 forms a closed loop extending around a full circumference of the lower layer 22. Furthermore, the series of tubules 28 is positioned adjacent to each other and is distributed across a full width of the top surface 30 of the lower layer 22. Each of the series of tubules 28 contains a fluid dye 32 that has a highly visible color, including but not being limited to various shades of green. Additionally, each of the series of tubules 28 is comprised of a fluid impermeable material to inhibit the fluid dye 32 from escaping the series of tubules 28. Each of the series of tubules 28 is comprised of a shatterable material, including but not being limited to glass or plastic, such that each of the series of tubules 28 shatters when the crimping tool 14 applies the sufficient compressive force. In this way the fluid dye 32 in each of the series of tubules 28 is released from the series of tubules 28.

The reactive layer 18 includes an outer layer 34 that has a lower surface 36 which is bonded to the series of tubules 28 and the lower surface 36 completely covers the series of tubules 28. The outer layer 34 is continuous such that the outer layer 34 defines a closed loop which extends around a full circumference of each of the series of tubules 28. The outer layer 34 is comprised of a fluid absorbent material, including but not limited to polyester or nylon, thereby facilitating the outer layer 34 to absorb the fluid dye 32 when the series of tubules 28 is shattered. In this way the outer layer 34 is infused with the highly visible color of the fluid dye 32 such that the fluid dye 32 in the outer layer 34 is visible to the worker 20.

In use, the crimp ring 12 is positioned around the cross-linked polyethylene plumbing pipe 16 at a strategic location to form a joint and the crimping tool 14 is employed to crimp the crimp ring 12. In this way the reactive layer 18 is exposed to the sufficient compressive force to change colors. Thus, the worker 20 can visually identify that the crimp ring 12 has been fully crimped. In this way the worker 20 can quickly inspect a plumbing project to visually verify that each crimp ring 12 in the plumbing project has been fully crimped rather than having to physically inspect each crimp ring 12.

With respect to the above description then, it is to be realized that the optimum dimensional relationships for the parts of an embodiment enabled by the disclosure, to include variations in size, materials, shape, form, function and manner of operation, device and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A color changing crimp ring device which changes color when crimped to facilitate a worker to visually identify that a crimp ring on a plumbing line has been fully crimped, said device comprising:
    a crimp ring being comprised of deformable material that is sufficiently resilient to facilitate said crimp ring to resist being deformed until exposed to a sufficient compressive force generated by a crimping tool wherein said crimp ring is configured to be crimped around a cross-linked polyethylene plumbing pipe;
    a reactive layer being applied to said crimp ring, said reactive layer normally displaying a neutral color, said reactive layer reacting to said sufficient compressive force generated by said crimping tool such that said reactive layer displays a highly visible color wherein said reactive layer is configured to facilitate a worker to visually identify that said crimp ring has been fully crimped onto the cross-linked polyethylene plumbing pipe;
    wherein said reactive layer comprises a lower layer having a bottom surface being bonded to an outer surface of said crimp ring, said lower layer completely covering said outer surface of said crimp ring having said lower layer extending around a full circumference of said outer surface; and
    wherein said reactive layer includes a series of tubules being applied to a top surface of said lower layer, each of said series of tubules being continuous such that each of said series of tubules forms a closed loop extending around a full circumference of said lower layer, said series of tubules being positioned adjacent to each other and being distributed across a full width of said top surface of said lower layer.

2. The device according to claim 1, wherein each of said series of tubules contains a fluid dye having a highly visible color.

3. The device according to claim 2, wherein each of said series of tubules is comprised of a fluid impermeable material to inhibit said fluid dye from escaping said series of tubules.

4. The device according to claim 2, wherein each of said series of tubules is comprised of a shatterable material such that each of said series of tubules shatters when said crimping tool applies said sufficient compressive force thereby facilitating said fluid dye in each of said series of tubules to be released from said series of tubules.

5. The device according to claim 4, wherein said reactive layer includes an outer layer being positioned over said series of tubules, said outer layer being comprised of a fluid absorbent material thereby facilitating said outer layer to absorb said fluid dye when said series of tubules is shattered such that said outer layer is infused with said highly visible color of said fluid dye wherein said fluid dye in said outer layer is configured to be visible to the worker.

6. The device according to claim 1, wherein said reactive layer includes an outer layer having a lower surface being bonded to said series of tubules, said lower surface completely covering said series of tubules, said outer layer being continuous such that said outer layer defines a closed loop which extends around a full circumference of each of said series of tubules.

7. A color changing crimp ring device which changes color when crimped to facilitate a worker to visually identify that a crimp ring on a plumbing line has been fully crimped, said device comprising:
- a crimp ring being comprised of deformable material that is sufficiently resilient to facilitate said crimp ring to resist being deformed until exposed to a sufficient compressive force generated by a crimping tool wherein said crimp ring is configured to be crimped around a cross-linked polyethylene plumbing pipe; and
- a reactive layer being applied to said crimp ring, said reactive layer normally displaying a neutral color, said reactive layer reacting to said sufficient compressive force generated by said crimping tool such that said reactive layer displays a highly visible color wherein said reactive layer is configured to facilitate a worker to visually identify that said crimp ring has been fully crimped onto the cross-linked polyethylene plumbing pipe, said reactive layer comprising:
  - a lower layer having a bottom surface being bonded to an outer surface of said crimp ring, said lower layer completely covering said outer surface of said crimp ring having said lower layer extending around a full circumference of said outer surface;
  - a series of tubules being applied to a top surface of said lower layer, each of said series of tubules being continuous such that each of said series of tubules forms a closed loop extending around a full circumference of said lower layer, said series of tubules being positioned adjacent to each other and being distributed across a full width of said top surface of said lower layer, each of said series of tubules containing a fluid dye having a highly visible color, each of said series of tubules being comprised of a fluid impermeable material to inhibit said fluid dye from escaping said series of tubules, each of said series of tubules being comprised of a shatterable material such that each of said series of tubules shatters when said crimping tool applies said sufficient compressive force thereby facilitating said fluid dye in each of said series of tubules to be released from said series of tubules; and
  - an outer layer having a lower surface being bonded to said series of tubules, said lower surface completely covering said series of tubules, said outer layer being continuous such that said outer layer defines a closed loop which extends around a full circumference of each of said series of tubules, said outer layer being comprised of a fluid absorbent material thereby facilitating said outer layer to absorb said fluid dye when said series of tubules is shattered such that said outer layer is infused with said highly visible color of said fluid dye wherein said fluid dye in said outer layer is configured to be visible to the worker.

* * * * *